United States Patent [19]
Lewis et al.

[11] Patent Number: 5,701,733
[45] Date of Patent: Dec. 30, 1997

[54] DOUBLE RABBET COMBUSTOR MOUNT

[75] Inventors: Eric A. Lewis, Chestnut Hill; Robert H. Slater, Beverly, both of Mass.

[73] Assignee: General Electric Company, Cincinnati, Ohio

[21] Appl. No.: 577,070

[22] Filed: Dec. 22, 1995

[51] Int. Cl.⁶ .................................................. F03B 1/04
[52] U.S. Cl. ....................... 60/39.31; 60/39.75; 415/209.2
[58] Field of Search ............................... 60/39.31, 39.75, 60/39.37; 415/209.2, 209.3

[56] References Cited

U.S. PATENT DOCUMENTS

| | | | |
|---|---|---|---|
| 3,826,084 | 7/1974 | Branstrom et al. | 60/39.31 |
| 3,965,066 | 6/1976 | Sterman et al. | 60/39.32 |
| 4,353,679 | 10/1982 | Hauser | 415/115 |
| 4,466,239 | 8/1984 | Napoli et al. | 60/39.75 |
| 5,211,536 | 5/1993 | Ackerman et al. | 415/209.3 |
| 5,224,822 | 7/1993 | Lenahan et al. | 415/189 |
| 5,343,694 | 9/1994 | Torborg et al. | 60/39.31 |

Primary Examiner—Timothy Thorpe
Assistant Examiner—Ted Kim
Attorney, Agent, or Firm—Andrew C. Hess; Wayne O. Traynham

[57] ABSTRACT

A combustor mount joins a mounting arm of a combustor to a conical nozzle support of a turbine nozzle. The mounting arm includes a conical mounting flange having first and second axially spaced apart radial lands and a plurality of circumferentially spaced apart outer holes. The nozzle support includes a conical seat having first and second axially spaced apart radial rabbets and a plurality of circumferentially spaced apart inner holes. The first and second lands are disposed on respective ones of the first and second rabbets, with the outer and inner holes being aligned. A plurality of fasteners extend through respective pairs of the aligned holes for clamping together the mounting flange to the seat to mount the combustor to the nozzle support.

10 Claims, 2 Drawing Sheets

DOUBLE RABBET COMBUSTOR MOUNT

The US Government has rights in this invention in accordance with contract No. N00019-92-C-0149 awarded by the Department of the Navy.

BACKGROUND OF THE INVENTION

The present invention relates generally to gas turbine engines, and, more specifically, to mounting combustors therein.

In a typical gas turbine engine, air is compressed in a compressor and mixed with fuel in a combustor and ignited for generating hot combustion gas which flows downstream through one or more stages of turbines for extracting energy therefrom. Disposed immediately downstream from the combustor is a high pressure turbine nozzle which directs the combustion gas between the rotor blades of a high pressure turbine rotor which extracts energy for powering the compressor. The combustion gas creates a large pressure load or force on the turbine nozzle which must be suitably reacted or carried within suitable stress limits for providing an effective useful life of the components.

The nozzle is typically mounted in the engine by a radially inner, conical nozzle support which extends axially upstream below the combustor and has a forward flange which is bolted to a structural inner casing which extends further upstream and is suitably joined to an outer casing of the engine.

The combustor itself must also be suitably mounted in the engine, and in one conventional design it includes an annular mounting arm extending from the aft end of a combustor inner liner, with the mounting arm having a corresponding mounting flange which is fastened to a corresponding seat formed in a portion of the nozzle support. The nozzle support is spaced radially inwardly from the inner liner to define an annular flowpath therebetween for channeling high pressure compressor discharge air to the nozzle for cooling thereof. The flowpath must be suitably sized for carrying sufficient cooling air, and therefore typically limits the available space in which the combustor mounting arm may be positioned. This in turn affects the design of the mounting flange and corresponding seat on the nozzle support.

Since the nozzle support is conical, the mounting flange is also conical which increases the difficulty of providing an accurate fastened joint therebetween. If the mounting flange and seat were simply flat and parallel components, conventional manufacturing tolerances in producing the separate components would produce random variations in the actually machined cone angles thereof. Differences in the machined cone angles result in misalignment between the components, which if were then fastened together would cause deformation and locally increased bending stresses as the mounting flange is compressed by the fasteners to engage the seat around the full circumference thereof.

Accordingly, the mounting seat is typically formed using a pair of radial and axial rabbets or seats defining an inside corner in which the mounting flange may be positioned and fastened. The mounting flange has corresponding axial and radial lands which engage the radial and axial rabbets of the seat. Fasteners, such as nuts and bolts, are circumferentially spaced apart from each other around the circumference of the mounting flange and extend therethrough and through the center of the inside corner between the radial and axial rabbets. A suitable clearance or gap is provided between the mounting flange and the seat near the bolts so that as the bolts are tightened in tension, the mounting flange is compressed in the corner for seating the lands thereof against the corresponding rabbets of the seat. In this way, the mounting flange engages the seat along two circular lines of contact which better accommodates the conventional manufacturing tolerances between the two parts.

Furthermore, in order to reduce or eliminate bending loads, and therefore bending stress in the individual fasteners, the mounting flange and nozzle support seat are typically aligned parallel with each other at 45° cone angles so that reaction loads from the radial and axial seat rabbets are symmetrical relative to the fastener resulting in the fastener being loaded in simple tension without significant bending load or stress therein.

Since the nozzle support is a highly loaded component due to the nozzle loads carried therethrough during operation, it is desirable that its axial section be substantially straight without bends or kinks which would otherwise locally increase stress therein. If conventional design constraints prevent the use of a 45° cone angle for the nozzle support, it must be locally modified at the combustor mounting seat for providing the preferred 45° cone angle to ensure symmetrical loading of the fasteners without bending thereof. As the nozzle support cone angle deviates from 45°, the local bend or kink required for the mounting seat becomes larger for accommodating the nozzle loads within acceptable stress limits.

In one advanced gas turbine engine design being developed, design constraints require a nozzle support cone angle substantially smaller than 45° which makes impractical the use of a local 45° combustor mounting arm seat due to the substantial kink which would be required. If the mounting arm and seat are mounted parallel to the smaller cone angle nozzle support without the 45° symmetry, substantial bending loads and stresses will occur in the fasteners. Accordingly, an improved combustor mount for nozzle supports is desired for eliminating or reducing fastener bending loads in mounting flanges and seats oriented at other than 45°.

SUMMARY OF THE INVENTION

A combustor mount joins a mounting arm of a combustor to a conical nozzle support of a turbine nozzle. The mounting arm includes a conical mounting flange having first and second axially spaced apart radial lands and a plurality of circumferentially spaced apart outer holes. The nozzle support includes a conical seat having first and second axially spaced apart radial rabbets and a plurality of circumferentially spaced apart inner holes. The first and second lands are disposed on respective ones of the first and second rabbets, with the outer and inner holes being aligned. A plurality of fasteners extend through respective pairs of the aligned holes for clamping together the mounting flange to the seat to mount the combustor to the nozzle support.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
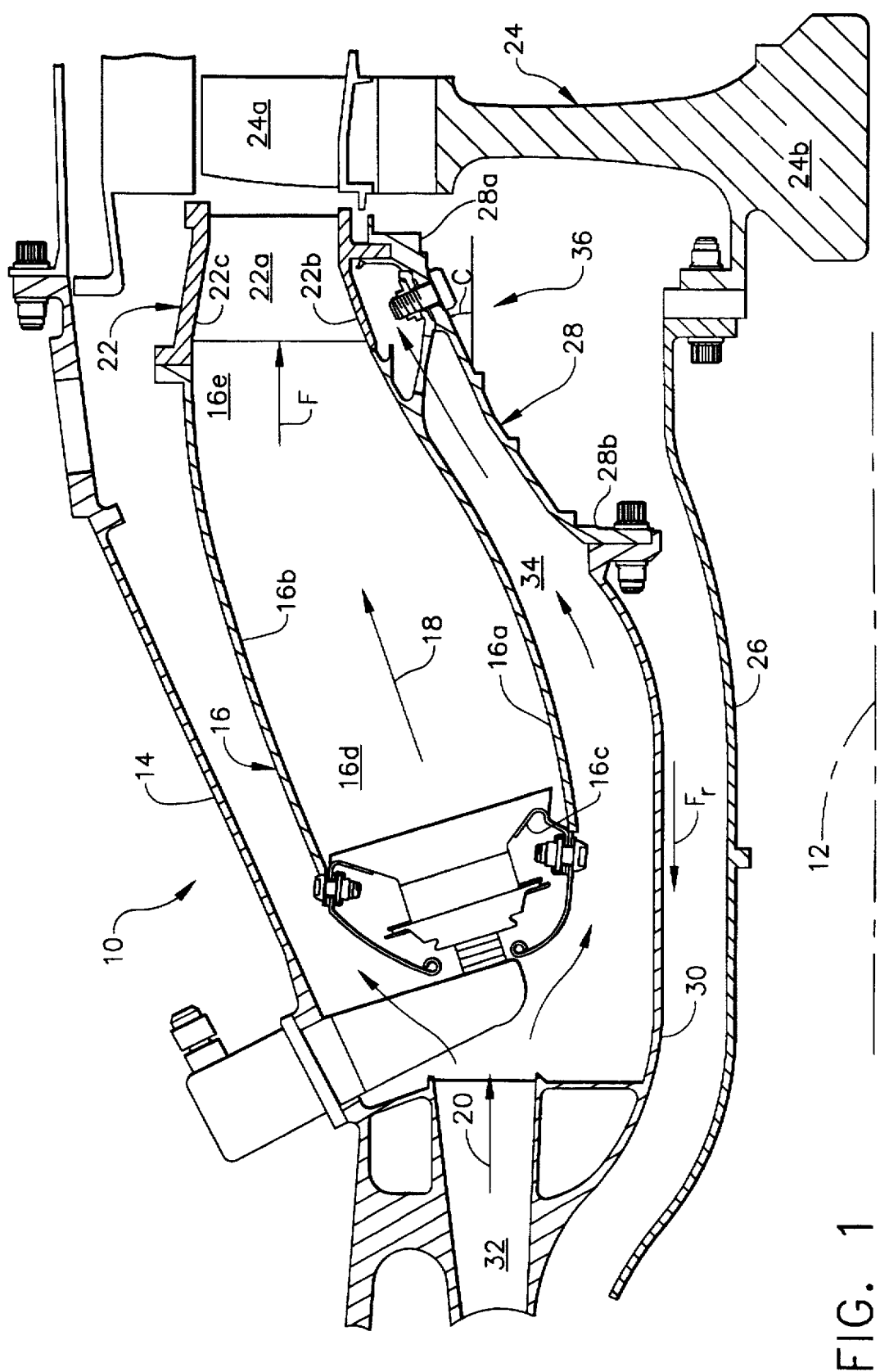
FIG. 1 is an elevational, partly sectional view of a gas turbine engine combustor mounted to a turbine nozzle support in accordance with one embodiment of the present invention.

Illustrated in FIG. 1 is a portion of an exemplary aircraft gas turbine engine 10 which is axisymmetrical about a longitudinal or axial centerline axis 12. The engine 10 includes an annular outer casing 14, a portion of which is illustrated in FIG. 1 surrounding an annular combustor 16, a high pressure turbine disposed downstream therefrom, and a compressor (not shown) disposed upstream therefrom. The combustor 16 includes spaced apart radially inner and outer liners 16a,b joined together at forward ends thereof to an inlet dome 16c, which defines therebetween an annular combustion chamber 16d for producing combustion gas 18 in a conventional manner. Pressurized compressor discharge air 20 is conventionally mixed with fuel and ignited in the combustor 16 for producing the combustion gas 18 which flows downstream therefrom. The aft ends of the liners 16a,b define an annular outlet 16e from which the combustion gas 18 is discharged.

An annular high pressure turbine nozzle 22 is disposed adjacent to the combustor outlets 16e for receiving the combustion gas 18. The turbine nozzle 22 is conventional and includes a plurality of circumferentially spaced apart hollow nozzle vanes 22a extending radially between integral inner and outer annular bands 22b and 22c.

Disposed downstream from the turbine nozzle 22 is a conventional high pressure turbine rotor 24 which includes a plurality of circumferentially spaced apart rotor blades 24a suitably joined to a rotor disk 24b. The rotor disk 24b is joined to a conventional shaft 26 which extends upstream and is joined to the compressor (not shown) for providing power thereto during operation.

The turbine nozzle 22 is a stationary component supported by a conical inner nozzle support 28 having an annular aft flange 28a at the aft end thereof which is conventionally fixedly joined to the inner band 22b of the nozzle 22. The nozzle support 28 also includes an annular forward flange 28b at the axially opposite end which is conventionally joined by suitable fasteners to an annular inner casing 30. The inner casing 30 extends upstream forwardly of the combustor 16 and is integrally joined with a conventional annular diffuser 32 which in turn is joined to the outer casing 14. The diffuser 32 diffuses the compressor discharge air 20 prior to entering the combustor 16 and also provides a suitable frame for carrying the loads from the turbine nozzle 22 created during operation.

More specifically, the combustion gas 18 channeled through the turbine nozzle 22 creates a large aft directed pressure load or force F thereon which must be suitably carried by the nozzle support 28 and inner casing 30 within acceptable stress limits. The nozzle support 28, and in turn the inner casing 30, therefore carry a reaction load or force $F_r$ for balancing the applied gas force F during operation. The nozzle support 28 is frustoconical with the forward flange 28b having a smaller diameter than the larger diameter of the aft flange 28a for providing a rigid structure to support the turbine nozzle 22. And, the nozzle support 28 is disposed coaxially about the centerline axis 12, and is also coaxial with and spaced radially inwardly from the combustor inner liner 16a to define an annular flowpath 34 for channeling a portion of the compressor discharge air 20 to the nozzle 22 for the conventional cooling thereof.

In the exemplary engine design illustrated in FIG. 1, the nozzle support 28 has a relatively low or shallow cone angle C at its aft end, and is positioned closely adjacent to the inner liner 16a providing little space for mounting the combustor 16. In accordance with one embodiment of the present invention, a combustor mount 36 mounts the aft end of the combustor 16 to the aft end of the nozzle support 28 supporting the nozzle 22.

Figure 2:
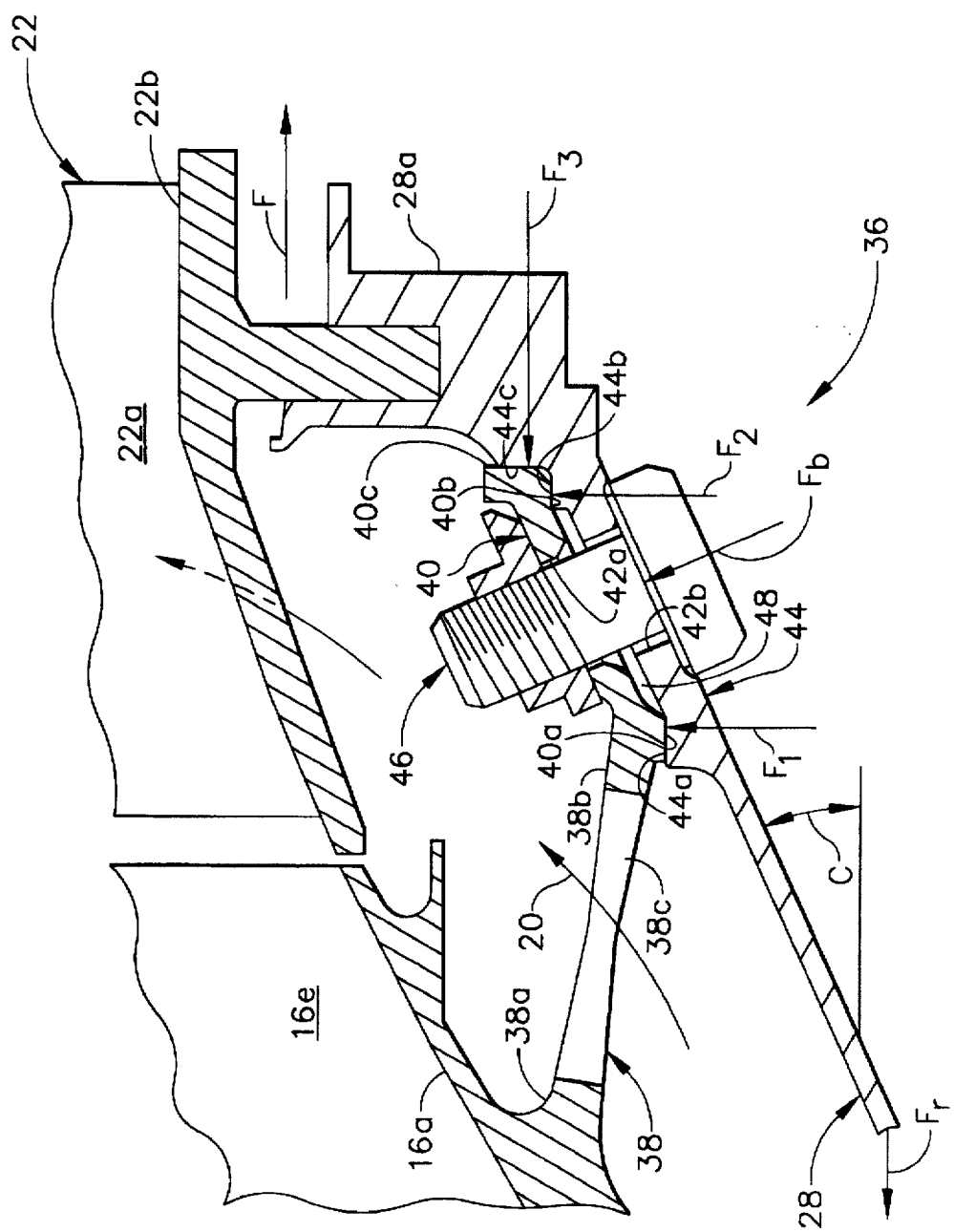
FIG. 2 is an enlarged, elevational partly sectional view of a mounting arm of the combustor illustrated in FIG. 1 joined to a corresponding mounting seat in the nozzle support.

The combustor mount 36 is illustrated in more detail in FIG. 2 in accordance with an exemplary embodiment of the present invention. The mount 36 includes an annular or conical mounting arm 38 having a proximal end 38a integrally formed coaxially with the combustor inner liner 16a adjacent the downstream, aft end thereof radially below the combustor outlet 16e. The arm 38 in the exemplary embodiment illustrated extends axially aft and includes a distal end 38b disposed adjacent to the nozzle support 28 near the aft flange 28a. The arm 38 includes a plurality of circumferentially spaced apart air holes 38c through which the discharge air 20 is channeled radially outwardly into the nozzle vanes 22a.

The mounting arm 38 further includes a conical mounting flange 40 integrally formed with the distal end 38b thereof. The mounting flange 40 includes first and second axially spaced apart radial contact lands 40a and 40b which extend axially and parallel to the centerline axis 12 of the engine (see FIG. 1), and are defined by corresponding diameter cylindrical inner surfaces thereof. Disposed axially between the first and second lands 40a,b are a plurality of circumferentially spaced apart outer bolt holes 42a.

The mounting flange 40 is received in a complementary conical seat 44 which forms an integral portion of the nozzle support 28 adjacent to the aft flange 28a. The seat 44 includes first and second axially spaced apart radial contact rabbets 44a and 44b which also extend axially and parallel to the centerline axis 12 and are formed by corresponding diameter cylindrical outer surfaces thereof. A plurality of circumferentially spaced apart inner bolt holes 42b are spaced axially between the first and second rabbets 44a,b and are each locally coaxially aligned with respective ones of the outer holes 42a in the radial direction. The respective first land 40a and first radial rabbet 44a are manufactured or machined with suitably equal diameters within conventional manufacturing tolerances for allowing a close or tight assembly thereof, with the first land 40a being seated or disposed on the first rabbet 44a. Similarly, the second land 40b and second rabbet 44b are manufactured or machined with nominally equal diameters within conventional manufacturing tolerances for allowing a close or tight assembly thereof, with the second land 40b being seated or disposed on the second rabbet 44b.

A plurality of suitable fasteners 46, in the exemplary form of conventional nuts and bolts, extend through respective pairs of the aligned outer and inner holes 42a,b for clamping together the mounting flange 40 to the seat 44 with a suitable compression clamping force $F_b$ to fixedly mount the combustor 16 to the nozzle support 28.

The mounting flange 40 is preferably parallel to the seat 44 at the outer and inner holes 42a,b, and the fasteners 46 are disposed perpendicular to both the flange 40 and the seat 44. The mounting flange 40 is also preferably spaced from the seat 44 between the first and second lands 40a,b and rabbets 44a,b to provide a suitable gap 48 therebetween for ensuring radial abutment of the mounting flange 40 and seat 44 solely at the first and second lands 40a,b and corresponding first and second rabbets 44a,b.

Since both the mounting flange 40 and seat 44 are generally parallel, conical members in part axially between the respective lands and rabbets thereof, the gap 48 may be simply provided by elevating the first land 40a at the forward end of the joint, and elevating the second rabbet 44b at the aft end of the joint. The second land 40b forms a simple obtuse intersection angle with the middle portion of the mounting flange 40, and similarly, the first rabbet 44a forms a corresponding obtuse intersection angle with the middle portion of the seat 44.

The mounting flange 40 preferably also includes a third or axial land 40c which extends radially and is defined by an axially aft flat face disposed adjacent to the second land 40b to define a right-angle outer corner therewith having a suitable chamfer therebetween.

The seat 44 correspondingly further includes a third or axial rabbet 44c which also extends radially and is defined by an axially forward flat face disposed adjacent to the second rabbet 44b to define a right-angle inner corner therewith which receives the complementary outer corner of the second and third lands 40b,c in radial and axial abutment therewith, respectively.

The improved mount 36 illustrated in FIG. 2 provides several advantages over the conventional symmetrical mount described above in the Background section. By providing the radial second rabbet 44b and corresponding second land 40b, symmetry of the joint is no longer required for reducing or eliminating bending forces in the fasteners 46. And, therefore, the joint defined by the mounting flange 40 and seat 44 is no longer limited to symmetrical configurations requiring a local 45° cone angle. A more compact joint, without a corresponding kink in the nozzle support 28 may therefore be made which reduces overall weight while still being able to carry the substantial reaction pressure force $F_r$ within acceptable stress limits in the nozzle support 28. And, the nozzle support 28 may be positioned closely adjacent to the inner liner 16a and have a relatively short mounting arm 38.

In the preferred embodiment illustrated in FIG. 2, the nozzle support 28 adjacent to and including the seat 44 is substantially straight in section for directly carrying the nozzle load or force F developed across the nozzle 22 without local bending loads developed at the seat 44, or without the need for providing a structural jog or kink therein to accommodate non-45° cone angles C. In the preferred embodiment, the mounting flange 40 and seat 44 are generally parallel with the nozzle support 28 both forward and aft of the seat 44 with corresponding cone angles not equal to 45°. In the exemplary embodiment illustrated in FIG. 2, the several cone angles are substantially less than 45°, with the nozzle support cone angle C adjacent to the seat 44 being about 24°, with the seat 44 and mounting flange 40 having correspondingly equal cone angles of about 24°.

In this exemplary embodiment, the mounting arm 38 extends axially aft from the inner liner 16a adjacent to the combustor outlet 16e and joins the mounting flange 40 at an obtuse intersection angle. In this way, a relatively short mounting arm 38 and integral flange 40 may be used for supporting the combustor 16 to the nozzle support 28 directly below the turbine nozzle 22 in a compact arrangement, with substantially shallow cone angles, and without undesirable bending of the fasteners 46 when loaded under tension.

FIG. 2 illustrates schematically the resultant compression bolt force $F_b$ applied by the fastener 46 to compress together the mounting flange 40 against a seat 44. The principle reaction forces are also illustrated schematically and include first and second vertical or radial forces $F_1$ and $F_2$ which act upwardly against the first and second lands 40a,b from the first and second radial rabbets 44a,b, and a third or axial reaction force $F_3$ which acts forwardly against the third land 40c from the third rabbet 44c. The third or axial rabbet 44c defines an axial stop which allows suitable alignment of the mounting flange 40 during assembly in a conventional manner.

Without the second land 40b and corresponding second radial rabbet 44b, the non-45° orientation of the mounting flange 40 and corresponding seat 44 would cause substantial reaction bending force in the fasteners 46 themselves with an attendant bending stress which is undesirable. The bending force on the fasteners 46 may be determined using a conventional free body analysis and summing the bending moment components created by the individual reaction forces and their corresponding moment arms.

In the exemplary embodiment illustrated in FIG. 2, the head of the fastener 46 is seated in a corresponding shallow counterbore in the inner surface of the seat 44, with the center of the fastener 46 at this location being a suitable origin about which the bending moments may be summed. Without the second land and rabbet 40b, 44b, the clockwise moment formed by the first reaction force $F_1$ is canceled in part by the counterclockwise moment formed by the third reaction force $F_3$. By introducing the additional second radial land 40b and corresponding rabbet 44b, an additional counterclockwise moment formed by the second reaction force $F_2$ is also available to counteract the clockwise moment from the first reaction force $F_1$. Analysis indicates that the resulting bending moments are substantially reduced or eliminated in this design having non-45° cone angles in a corresponding nonsymmetric joint.

The double radial rabbet joint illustrated in FIG. 2, along with the axial rabbet or stop 44c enjoys the same manufacturing and assembly advantages of the conventional single radial rabbet and single axial rabbet conventional design, but additionally allows for non-45° cone angles not possible in the conventional design without undesirable nozzle support kinking or bending loads in the fasteners. Manufacturing tolerances in forming the respective cone angles of the mounting flange 40 and seat 44 are readily accommodated without undesirable distortion or stress therein by the multi-point contact arrangement illustrated in FIG. 2. The additional second rabbet 44b is effective by itself or in combination with the axial rabbet 44c to counteract the bending moment imposed on the fasteners 46 by the first radial rabbet 44a. Bending of the fasteners 46 is therefore minimized or eliminated without changing the shallow nozzle support cone angle C in the vicinity of the seat 44 for therefore more effectively carrying the substantial nozzle force F during operation. And, the compact and relatively low weight double radial rabbet joint provides yet further advantages for an aircraft gas turbine engine application wherein size and weight are significant design considerations.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

We claim:

1. A combustor mount comprising:

an annular combustor having radially inner and outer liners joined together at one end to a dome and defining therebetween a combustion chamber for producing combustion gas, said liners defining an outlet at opposite ends thereof for discharging said combustion gas;

a turbine nozzle disposed adjacent to said combustor outlet for receiving said combustion gas;

a conical nozzle support having an aft flange at one end fixedly joined to said nozzle, and a smaller diameter forward flange at an opposite end, said nozzle support being disposed coaxially with and spaced from said inner liner to define an annular flowpath for channeling compressor discharge air to said nozzle;

said inner liner having an integral annular mounting arm extending to said nozzle support, with said arm having a conical mounting flange at a distal end thereof, said mounting flange including first and second axially spaced apart radial lands and a plurality of circumferentially spaced apart outer holes therebetween;

said nozzle support having a conical seat for receiving said mounting flange, with said seat including first and second axially spaced apart radial rabbets and a plurality of circumferentially spaced apart inner holes therebetween, with said first and second lands being disposed on respective ones of said first and second rabbets, and with said outer and inner holes being aligned; and a plurality of fasteners extending through respective pairs of said aligned outer and inner holes for clamping together said mounting flange to said seat to mount said combustor to said nozzle support.

2. A mount according to claim 1 wherein said mounting flange is parallel to said seat at said outer and inner holes, and said fasteners are disposed perpendicular thereto.

3. A mount according to claim 2 wherein said mounting flange is spaced from said seat between said first and second lands and rabbets to provide a gap therebetween for ensuring radial abutment of said mounting flange and seat solely at said lands and rabbets.

4. A mount according to claim 3 wherein:

said mounting flange further includes an axial third land adjacent to said second land to define an outer corner; and said seat further includes an axial third rabbet adjacent to said second rabbet to define an inner corner receiving said outer corner in radial and axial abutment.

5. A mount according to claim 4 wherein said nozzle support adjacent to and including said seat is substantially straight for directly carrying nozzle load developed across said nozzle due to flow of said combustion gas therethrough without local bending loads at said seat.

6. A mount according to claim 4 wherein said mounting flange and seat are parallel with said nozzle support both forward and aft of said seat.

7. A mount according to claim 4 wherein said nozzle support adjacent to said seat has a cone angle C not equal to 45°.

8. A mount according to claim 7 wherein said nozzle support cone angle is about 24°.

9. A mount according to claim 8 wherein said seat and mounting flange have cone angles of about 24°.

10. A mount according to claim 4 wherein said mounting arm extends axially aft from said inner liner adjacent to said combustor outlet and joins said mounting flange at an obtuse angle.

* * * * *